Aug. 9, 1927.  
W. F. POLSON  
1,638,211  
TRANSMISSION OR BRAKE BAND  
Filed March 11, 1925
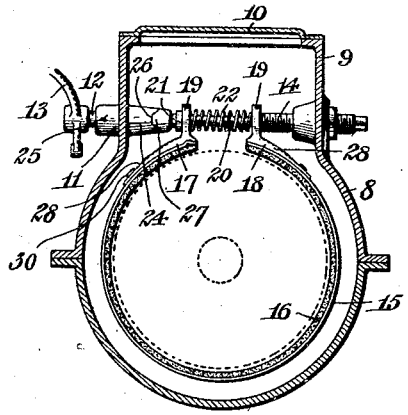
Fig. 1.
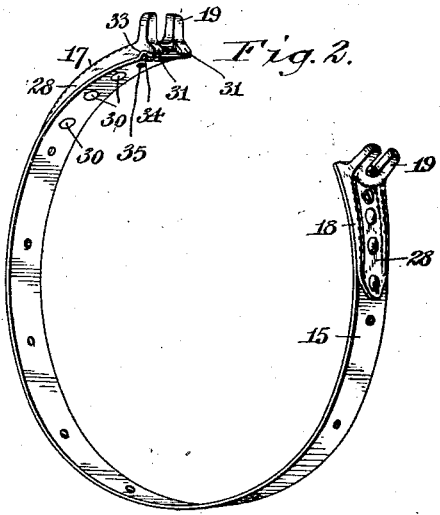
Fig. 2.
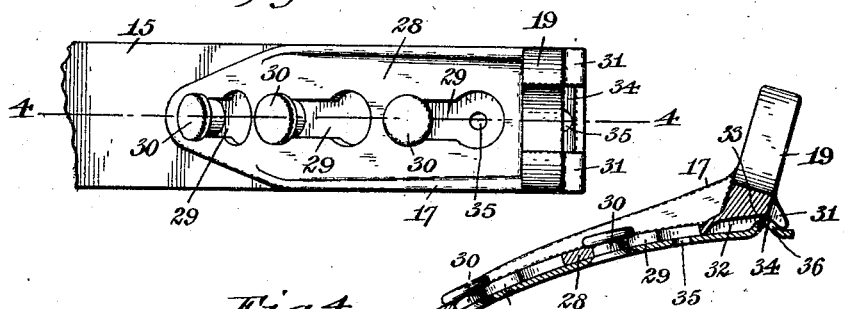
Fig. 3.
Fig. 4.
Fig. 5.
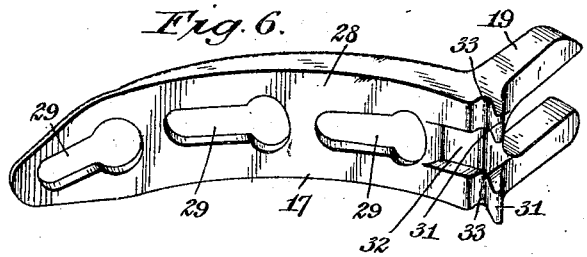
Fig. 6.
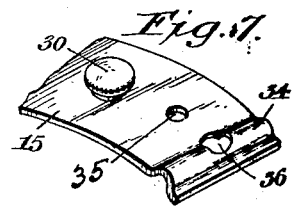
Fig. 7.
Witness:  
J. J. Oberst,
William F. Polson, Inventor.  
By Emil Neuhart  
Attorney.

Patented Aug. 9, 1927.

1,638,211

UNITED STATES PATENT OFFICE.

WILLIAM F. POLSON, OF BUFFALO, NEW YORK.

TRANSMISSION OR BRAKE BAND.

Application filed March 11, 1925. Serial No. 14,631.

My invention relates to automobile transmission or brake bands, and more particularly to that type applied to planetary transmission-mechanisms, such as employed in Ford automobiles.

Transmission or brake bands of Ford automobiles are provided at their ends with connectors adapted for co-action with parts of operating mechanism manipulated by foot. My invention relates more specifically to that type of such transmission or brake bands having one of the connectors removably secured to the band, to permit of readily removing the band from the casing enclosing the transmission mechanism, and also of inserting a band around a drum forming part of such transmission mechanism.

One of the objects of my invention is to provide a removable connector at one end of a transmission or brake band, which is of simple construction, and which can be easily attached to the band with assurance that it will be maintained thereon until intentionally removed.

Another object of my invention is to provide simple means of connecting the connector to the band and to utilize the end of the band as a spring retainer.

A still further object is to provide a band of this type with a removable connector having a plurality of key-hole slots adapted to receive and lock into them headed studs projecting from the outer surface of the band and wherein also the band is provided with a transverse bead or rib at its outer end and the connector with a transverse notch or groove adapted to receive said bead or rib and prevent displacement of said headed studs from said key-hole slots.

A still further object of my invention is to provide means of simple construction to enable the band to be drawn upwardly around the drum to which it is to be applied, which means is adapted for co-action with a suitable tool inserted into the transmission mechanism casing.

With the above and other objects in view the invention consists in the novel features of construction, and in the arrangement and combination of parts to be hereinafter described and more particularly pointed out in the subjoined claims.

In the drawings:—

Fig. 1 is a transverse section through a transmission casing of a Ford automobile, showing the manner in which my invention is utilized.

Fig. 2 is a detached perspective view of a transmission or brake band constructed in accordance with this invention.

Fig. 3 is a plan view of that end of the band having my removable connector applied thereto.

Fig. 4 is a longitudinal section taken on line 4—4, Fig. 3.

Figs. 5 and 6 are detached perspective views of the removable connector viewed from different points.

Fig. 7 is a perspective view of that end of the band adapted to have the removable connector applied thereto.

In the drawings, like numerals of reference refer to like parts, the numeral 8 designating the transmission casing of an automobile in which transmission or brake bands are arranged around drums controlling the operation of the driving mechanism of the automobile. Only one of the three bands employed in connection with transmission mechanism of the kind referred to is shown in the drawing, and to those skilled in the art to which this invention relates, it is understood that each band is operated by individual foot-operated mechanism.

The transmission casing is formed with an upward extension or bonnet 9, which has an opening at its upper end closed by a cover 10, said cover being removable to gain access to the interior of the transmission casing.

Mounted for combined rocking and sliding movement in a bearing 11 in one wall of the bonnet of said casing is a shaft 12 to which an operating pedal 13 is secured. A bearing alined therewith is formed on the opposite wall of said bonnet and in the same is adjustably mounted a guide sleeve 14.

15 designates the transmission or brake band which is provided with the usual brake lining 16 and is of open ring formation. At the ends of this open brake band, connectors 17, 18 are attached, one of which is permanently secured to one end of the band and the other detachably secured to the other end of said band. Each of these connectors has a bifurcated ear or lug 19 at its outer end.

20 designates a slide rod which has at one end an enlargement or head 21 bearing against one of the bifurcated lugs 19. Said rod extends through the bifurcations of both lugs and is slidably entered in the guide sleeve 14. Surrounding this slide rod and bearing with opposite ends against the opposing faces of said bifurcated ears is a spiral spring 22, which exerts its pressure at all times against said lugs to keep the band in open or ineffective condition. The outer end of the enlargement or head 21 has the inner end of the shaft 12 bearing thereagainst. The bearing 11 is elongated and the elongation thereof is formed by lugs 24, 25, extending, respectively, inwardly and outwardly from the wall in which said bearing is formed. The lug 24 is provided with cam notches 26 adapted to receive cam lugs 27 formed on a collar integral with or secured to the shaft 12. Therefore, upon depressing the pedal, the shaft 12 will be rocked and caused to slide within its bearing, due to the fact that the cam lugs 27 will be moved inwardly out of the cam notches 26, with the result that the inward movement of these cam lugs will cause the slide rod 20 to move in its guide sleeve, and by reason of the inner end of the enlargement or head 21 on said slide rod bearing against the ear or lug on the connector 17, the band will be tightened around the drum with which it co-acts, as will be understood by those conversant in the art to which this invention relates.

The part of the description thus far referred to by reference numerals forms no part of my invention, and is used simply to illustrate the mode of operating the transmission or brake band. It is therefore clear that this operating mechanism may be constructed in various other ways.

The transmission or brake band 15 may have the permanently secured connector fastened thereto in any approved manner. In the drawings this lug or ear is shown as being riveted to the band.

As is common in connectors of this kind, both the permanent or fixed connector and the removable connector have their bifurcated ears or lugs extending outwardly from an arcuate base portion 28.

In the base portion 28 of my improved removable connector, a plurality of key or button-hole slots 29 are formed, which are in longitudinal alinement, the enlargement of each slot being at the outer end thereof.

Riveted or otherwise fastened so as to extend from the outer surface of the band near one end thereof, are a plurality of headed studs 30, the shanks of which are of a diameter to fit the narrow portion of the key or button-hole slots while the heads thereof bear against the outer surface of the base portion 28 of the connector, the enlarged ends of said key or button-hole slots being of a size to permit the heads to be passed therethrough from the inner side of the base portion of said connector and, when passed through said slots, to lie above the upper surface of the base.

After the headed ends of the studs are passed through the enlarged portion of the key or button-hole slots, it is simply necessary to draw the connector outwardly or toward the end of the band so as to move the shanks of the studs into the narrow portions of said slots and bring the headed ends of said studs in contact with the outer surface of said connector at opposite sides of the slots and at the narrow ends thereof.

At the outer end of the removable connector, two ears 31 project therefrom, these ears being spaced apart and terminating even, or approximately so, with the end of the band. On the under side of this connector a longitudinal depression or groove 32 is formed which extends inwardly from the end of the connector and from a point between said ears, for a purpose to appear hereinafter. In the bottom of said connector, at each side of said longitudinal depression or groove, a transverse groove 33 is formed, part of the wall of each groove 33 being formed by the under side of one of the ears 31.

In close proximity to the outer extremity of the band, but in definitely spaced relation to the outermost headed stud 30 projecting from said band, is an external projecting portion in the form of a transverse bead or rib 34 formed by stamping the metal of the band outwardly to form a groove on its inner face, and extending through this bead or rib is an opening 35, for a purpose to appear hereinafter.

The bead or rib 34 of said band provides opposite receding portions at opposite sides of a line passing centrally through the same and it is entered in the grooves 33 on the under side of the connector when the latter is properly positioned on the band. When so positioned the ears 31 lie over the outer half of said bead and preferably in contact with the end marginal portion of the band adjacent said bead. The longitudinal depression or groove 32 provides a clearance space so that when attaching the connector 17 to the band or removing the same therefrom, said connector may pass over the head of a rivet passed through an opening 35 in the band, which rivet is used for fastening the brake lining to the band.

36 designates an opening formed in the band near its outer end, preferably in the bead or rib 34 of the band; and in the act of passing the band around a drum within a transmission casing, a wire or other suitable tool, for example one with a hook-like end, can have the hook portion thereof thrust through the opening 36 to draw the band up fully around the drum so that the connector 17 can be easily attached thereto.

In order to place the connector on the band, it is only necessary to pass the headed ends of the studs 30 through the enlarged portions of the key or button-hole slots 29, then move said connector outwardly to force the ears 31 in contact with and over the bead or rib 34, and at the same time cause the studs to enter the narrow portions of the key or button-hole slots so as to bring the closed ends of said narrow portions in contact with the shanks of said buttons, and also to bring the heads in contact with the outer surface of the base portion of the connector at opposite points of the narrow portion of said slots and also at the closed ends thereof.

It is to be noted that when moving the connector outwardly during the operation of securing the same to the band, the ears 31 will ride up onto the transverse bead or rib 34 on the band as the studs begin to enter the narrow portions of the key or button-hole slots of the connector, and that during this action of forcing the ears 31 over said bead, that portion of the band between the outermost stud and the extremity of the band will act as a spring and be deflected inwardly toward the center of the band until the ears 31 have reached the crest or uppermost portion of said transverse bead or rib, after which said ears will ride downwardly over the opposite side of the bead or rib and cause the latter to be entered in the transverse grooves 33 formed on the under side of the connector. During this action, the studs will be brought to the extreme inner ends of the slots 29.

The bead or rib 34 being entered in the transverse grooves 33 of the connector, will prevent movement lengthwise of said connector, while the heads of the studs prevent movement of said connector away from the band.

The construction described and illustrated provides a means for quickly and conveniently removing one of the connectors from the transmission or brake band, as it is simply necessary to tap the bifurcated ear or lug 19 of the connector to flex or spring the outer end of the band and force the ears 31 inwardly over the transverse bead or rib 34, which causes automatic disengagement of the studs 30 from the narrow portions of the key or button-hole slots so that the connector can be raised from the band by moving the same over the headed ends of the stud.

The mechanism shown and described also provides for conveniently attaching the connector to the band, and for this purpose it is simply necessary to pass the headed ends of the studs through the enlarged ends of the key or button-hole slots, move the connector outwardly until stopped by the ears 31 coming in contact with the transverse bead 34, after which it is simply necessary to exert pressure against the connector, either by tapping the bifurcated ear or lug, or otherwise, sufficiently to flex the outer portion of the band until the ears 31 pass over the crest of the transverse bead, when all parts will move by the force of the tap into connected position, in which the bead will be entered in the grooves 33 of the connector and the headed studs brought into contact with the narrow ends of the key or button-hole slots.

Having thus described my invention, what I claim is:—

1. A transmission or brake band, comprising an open ring band having a lining riveted thereto, and a connector, said band having a plurality of headed studs extending from its outer face and a transverse bead adjacent its outer extremity provided with an opening therethrough, said connector having a longitudinal groove on its under side extending inwardly from its outer end to provide a clearance space for one of the rivets of said lining, key-hole slots to receive said headed studs and a pair of ears at its outer end adapted to ride over said bead and prevent lengthwise movement of said connector on the band after attachment of said connector to said band.

2. A transmission or brake band, comprising an open ring band having a lining riveted thereto, and a connector, said band having a transverse external bead and an opening through said bead, said connector having a longitudinal depression extending inwardly from its outer end to provide clearance space for one of the rivets of said lining and a pair of grooves arranged transversely, one at each side of said longitudinal depression, the under side of said ears serving as part of the walls of said grooves, and co-acting means on said band and connector spaced from the outer ends thereof for connecting said connector to said band and preventing movement away from said band, the outer end portion of said band serving as a spring and being flexed during the action of attaching the connector to said band to cause said transverse bead to enter said grooves, said bead and groove serving to prevent movement lengthwise relatively of said connector and band.

In testimony whereof I affix my signature.

WILLIAM F. POLSON.